US007697011B2

(12) United States Patent
Dickey et al.

(10) Patent No.: US 7,697,011 B2
(45) Date of Patent: Apr. 13, 2010

(54) AUTOMATIC DISPLAY VIDEO POSITIONING AND SCALING SYSTEM

(75) Inventors: Bill A. Dickey, Corrales, NM (US); Kevin W. Blietz, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 874 days.

(21) Appl. No.: 11/282,983

(22) Filed: Nov. 18, 2005

(65) Prior Publication Data

US 2006/0125958 A1 Jun. 15, 2006

Related U.S. Application Data

(60) Provisional application No. 60/634,907, filed on Dec. 10, 2004.

(51) Int. Cl.
*G09G 5/00* (2006.01)
*G06T 1/00* (2006.01)

(52) U.S. Cl. .......................... 345/611; 345/16; 345/23; 345/418; 345/501; 348/511

(58) Field of Classification Search ......... 345/204–214, 345/16; 348/177, 178, 189, 511, 704
See application file for complete search history.

(56) References Cited

U.S. PATENT DOCUMENTS 3,786,479 A * 1/1974 Brown et al. ................. 345/2.2
4,070,710 A * 1/1978 Sukonick et al. ............ 345/533
4,635,050 A * 1/1987 Grothe et al. ................. 345/16
4,658,248 A * 4/1987 Yu ............................. 345/17
4,686,642 A * 8/1987 Buxton et al. .................. 708/8
4,769,703 A * 9/1988 Osborne et al. ............. 348/189
4,864,405 A * 9/1989 Chambers ................... 348/556
4,865,405 A * 9/1989 Kageyama .................. 359/359
4,874,992 A * 10/1989 Benson et al. .............. 315/387
5,099,179 A * 3/1992 Fox et al. ..................... 315/367
5,438,663 A * 8/1995 Matsumoto et al. ......... 345/520
5,557,297 A * 9/1996 Sharp et al. ................. 345/614
5,602,586 A * 2/1997 Schauer et al. .............. 348/189

(Continued)

FOREIGN PATENT DOCUMENTS

EP 224228 A2 * 6/1987

OTHER PUBLICATIONS

Benson, K.B., Television Engineering Handbook, 1986, McGraw Hill Book Company, pp. 13.14-13.16.*

(Continued)

*Primary Examiner*—Richard Hjerpe
*Assistant Examiner*—Dorothy Webb
(74) *Attorney, Agent, or Firm*—Ingrassia Fisher & Lorenz, P.C.

(57) ABSTRACT

An apparatus and method of automatically digitizing analog video and stroke and with size and positioning information. This is accomplished using signal characteristics of the deflection waveforms and video signals together with the video synchronization and blanking timing. This allows analog real time positioning and scaling by synchronizing the video data and deflection information. The deflection information in the form of signals either or both horizontal or X axis and vertical or Y axis characteristics such as amplitude, peak or peak to peak, and zero crossing, can be used to determine the size or scaling for each axis independently.

21 Claims, 2 Drawing Sheets

U.S. PATENT DOCUMENTS

| | | | | | |
|---|---|---|---|---|---|
| 5,841,430 | A * | 11/1998 | Kurikko | | 345/213 |
| 5,969,699 | A * | 10/1999 | Balram et al. | | 345/10 |
| 6,078,361 | A * | 6/2000 | Reddy | | 348/558 |
| 6,226,046 | B1 * | 5/2001 | Yamagata et al. | | 348/558 |
| 6,445,372 | B1 * | 9/2002 | Asai | | 345/99 |
| 2001/0024521 | A1 | 9/2001 | Anderson | | 382/218 |
| 2002/0180769 | A1 * | 12/2002 | Yin et al. | | 345/699 |
| 2004/0233181 | A1 * | 11/2004 | Kobayashi | | 345/204 |

OTHER PUBLICATIONS

International Search Report PCT/US2005/044634 dated Aug. 21, 2006.

Coker B. L. et al., "A Flat Panel Display Upgrade Solution Replaces Military CRT Technology," Proceedings of the IEEE 1997 National Aerospace and Electronics Conference. Naecon. Dayton, Jul. 14-17, 1997, Proceedings of the IEEE National Aerospace and Electronics Conference. Naecon, New York, IEEE, US, vol. 1, cof. 49, Jul. 14, 1997, pp. 114-119, XP000873281.

* cited by examiner

AUTOMATIC DISPLAY VIDEO POSITIONING AND SCALING SYSTEM

CROSS-REFERENCE TO RELATED APPLICATIONS

This application is based on U.S. Provisional Application Ser. No. 60/634,907 entitled "Display Video Positioning System" filed on Dec. 10, 2004, the teachings of which are incorporated herein by reference.

BACKGROUND OF THE INVENTION

1. Field of the Invention (Technical Field)

The present invention relates to displays and more particularly to video display processing of deflection based raster signals.

2. Background Art

Conversion of analog display presentation, in an analog deflection based video system for a cathode ray tube (CRT) type display, allows the position and size of the image to be determined strictly by the deflection amplitudes and offsets. Many legacy display systems use horizontal and vertical deflection signals to provide position and scaling in conjunction with another signal, bright-up, or video to provide intensity for video images on CRTs. The problem occurs when these legacy display systems migrate to digital display technology. The size and position of a video image, in a general sense, on normal monitors and digital display systems is based on the timing relationship of synchronization signal characteristics. This is due to the video standard definitions of synchronization and blanking timing that govern the image boundaries and position.

The problem is that video position is based on deflection waveforms for older analog displays. The input horizontal and vertical deflection signals are modified by the image source to change the video presentation and appearance characteristics in position, size, and scale. The conversion of video to time based systems loses the video positional scaling and dimensional information. This can lead to positional inaccuracies of the video presentation when digitally sampled and displayed.

U.S. Pat. No. 5,099,179, entitled "Remote Raster/Stroke Display Calibration" describes a remote registration and calibration system for a hybrid video display. However, this device differs substantially in that it is a one-time calibration to compensate for receiver circuit offset and errors.

SUMMARY OF THE INVENTION

Disclosure of the Invention

The present invention provides an apparatus and method for automatically digitizing analog video and stroke and with size scaling and positioning information. This is accomplished using signal characteristics of the deflection waveforms and video signals together with the video synchronization and blanking timing. This allows for analog real time positioning and scaling by synchronizing the video data and deflection information. The deflection information in the form of signals either or both horizontal or X axis and vertical or Y axis characteristics such as amplitude, peak or peak to peak, zero crossing, can be used to determine the size or scaling for each axis independently.

A primary object of the present invention is to provide automatic calibration of the raster image relative to a stroke image A primary advantage of the present invention is that it provides a method of automatically determining and displaying the changes in video format aspect ratio.

Another advantage of this invention is it automatically scales the incoming image to the same size an analog system would provide.

Yet another advantage is this invention will track in real time and correct the alignment position of video.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

Figure 1:
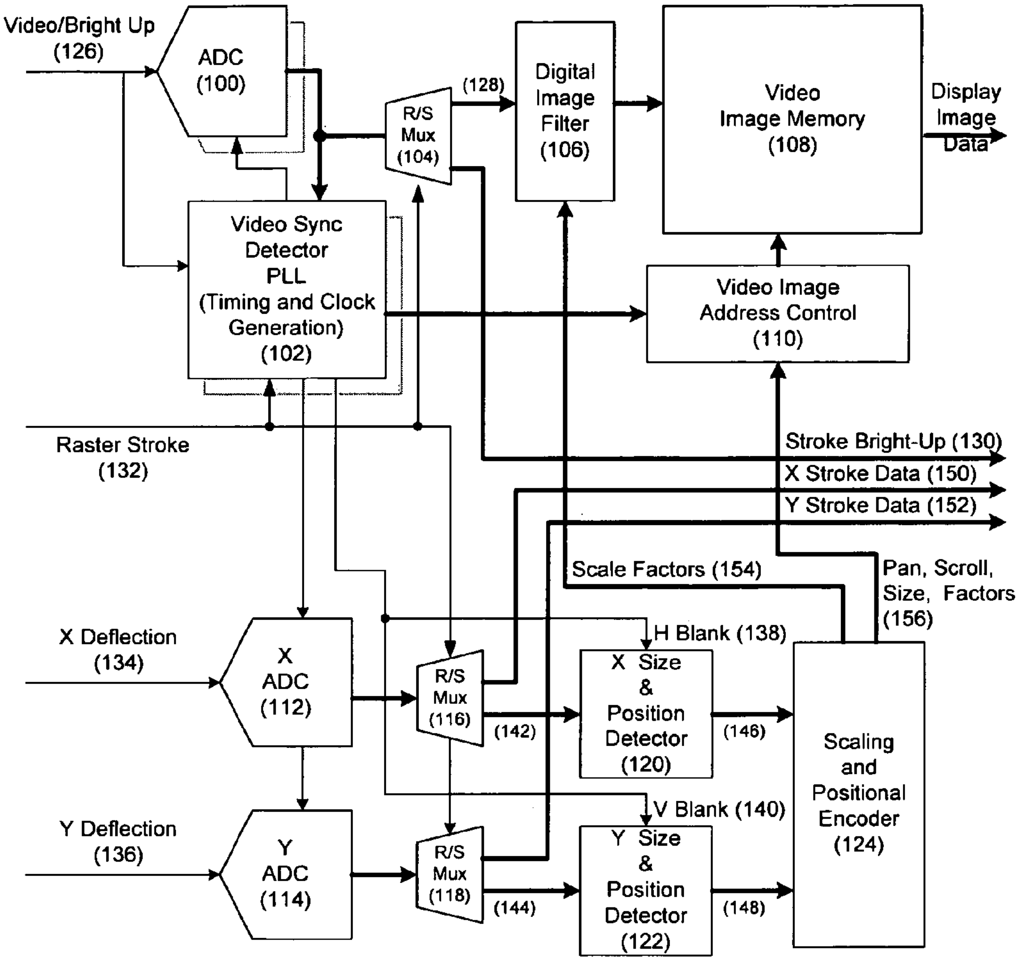
FIG. 1 shows the preferred embodiment of the invention.

FIG. 1 shows the preferred embodiment of the present invention. Incoming video/bright-up 126 signals are normally synchronized by video sync detector phase lock loop (PLL) and timing clock generator 102. Incoming intensity signal video/bright up 126 are input to analog to digital converter (ADC) 100 using a PLL clock 102 synchronously to convert the analog video into digital video for storage in an image memory 108. The incoming digitized video intensity is then multiplexed using raster/stroke multiplexer (R/S MUX) 104 to separate raster portion 128 from the stroke portion 130 of the incoming image. Raster video 128 is then optionally filtered utilizing a digital image filter 106. The storage in video image memory 108 is controlled by video image address control 110 logic function to facilitate frame buffering and/or de-interlacing.

The new process comprises deflection based video digitization using an automatic display video positioning and scaling system. The deflection digitization is normally captured by horizontal or X ADC 112 and by vertical or Y ADC 114, creating X stroke data 150 and Y stroke data 152. X stroke data 150 and Y stroke data 152 are combined with video/bright up 130 digitized intensity to provide a stroke image for rendering. The combination may be accomplished using beam former processing (not shown). The stroke image can be combined or overlaid on the background video stored in video image memory 108 in a subsequent process. The stroke intensity is multiplexed by raster/stroke signal 132 to be sent, with the stroke deflection data for addressing memory, to provide the complete stroke image. The video intensity is alternately multiplexed by raster/stroke signal 132 into R/S MUX 104 to be sent to video image memory 108 using the address control to provide the complete background video image.

Horizontal or X deflection signal 134 is synchronously digitized with X ADC 112 independently. The selection of raster deflection data is multiplexed by raster/stroke signal 132 using R/S Mux 116. Horizontal blanking signal, H blank 138 or equivalent, is sent from PLL and clock generating circuitry 102. X raster deflection data 142 is used by X size and position detector 120 to detect the horizontal positional and scaling factors of incoming video X deflection signals 134. The X raster deflection data is filtered for stability within the X size and position detector 120.

Y deflection signals 136 are synchronously digitized with Y ADC 114 independently. The selection of raster deflection data is multiplexed by the raster/stroke signal using R/S Mux 118. Vertical blanking signal, V Blank 140 or equivalent, is sent from PLL and clock generating circuitry 102. Y raster deflection data 144 is used by Y size and position detector 122 to detect the vertical positional and scaling factors of incoming video Y deflection signals 136. The Y raster deflection data is filtered for stability within the Y size and position detector 122.

The digitized X raster deflection data 142 values are multiplexed to X size and position detector 120 function using raster/stroke 132 signal R/S Mux 116. X size and position detector 120 switch the digitized video X raster deflection data 142 to logic that can ascertain video image characteristics. The logic in this block determines the image properties utilizing timing signals from the PLL like horizontal blanking or some other equivalent trigger signal. The detection of positional and scaling encoder 124 uses a number of characteristics such as end points, center, slope or rate for detection of both the horizontal boundaries of the deflection during active video times. The center detection or any point in relation to horizontal timing can be used to determine the offset in the presented deflection video image. The X deflection characteristics are sent to scaling and positional encoder 124.

The digitized Y raster deflection data 144 values are multiplexed to Y size and position detector 122 function using raster/stroke 132 signal R/S MUX 118. Y size and position detector 122 switch the digitized raster video deflection to logic that can ascertain video image characteristics. The logic in this block determines the image properties utilized timing signals from the PLL like vertical blanking or some other equivalent trigger signal. Detection of positional and scaling encoder 124 uses a number of characteristics such as end points, center, slope or rate for detection of both the vertical boundaries of the deflection during active video times. The center detection or any point in relation to vertical timing can be used to determine the offset in the presented deflection video image. The Y deflection characteristics are sent to scaling and positional encoder 124.

Scaling and positional encoder 124 will filter and calculate the results of X size and positional detector 120 and Y size and positional detectors 122 for determination of image characteristics. The aspect ratio of the displayed image can be determined by calculation of the horizontal and vertical deflection ramp, slopes, peak or peak to peak amplitudes. Pan scroll size factors 156 can be used with video image memory address and control 110, to anti-alias the image and appropriately position both vertically and horizontally and scale the video digitized data in the memory. Scaling factors 154 can be input into digital image filter 106 to adjust the filter characteristics corresponding to the scaling of sampled data. The scaling size and filter comprise the zoom function for the video image processing using the address and control function.

Scaling and positional encoder 124 can calculate the horizontal position or image location using the center point or any point within the active horizontal time period. The horizontal start and stop image position can be used for a pan function to correctly position the image horizontally.

Scaling and positional encoder 124 can calculate the vertical position or image location using the center point or any point within the active vertical field or frame time period. The vertical start and stop image position can be used for a scroll function to correctly position the image horizontally.

The zoom functions can be used in combination with video filtering parameter changes along with address range values to control the image size scaling both horizontally and vertically. The pan function can use the start and or ending address control to horizontal position the image. The scroll function can use the start and or ending address control to vertical position the image.

Figure 2:
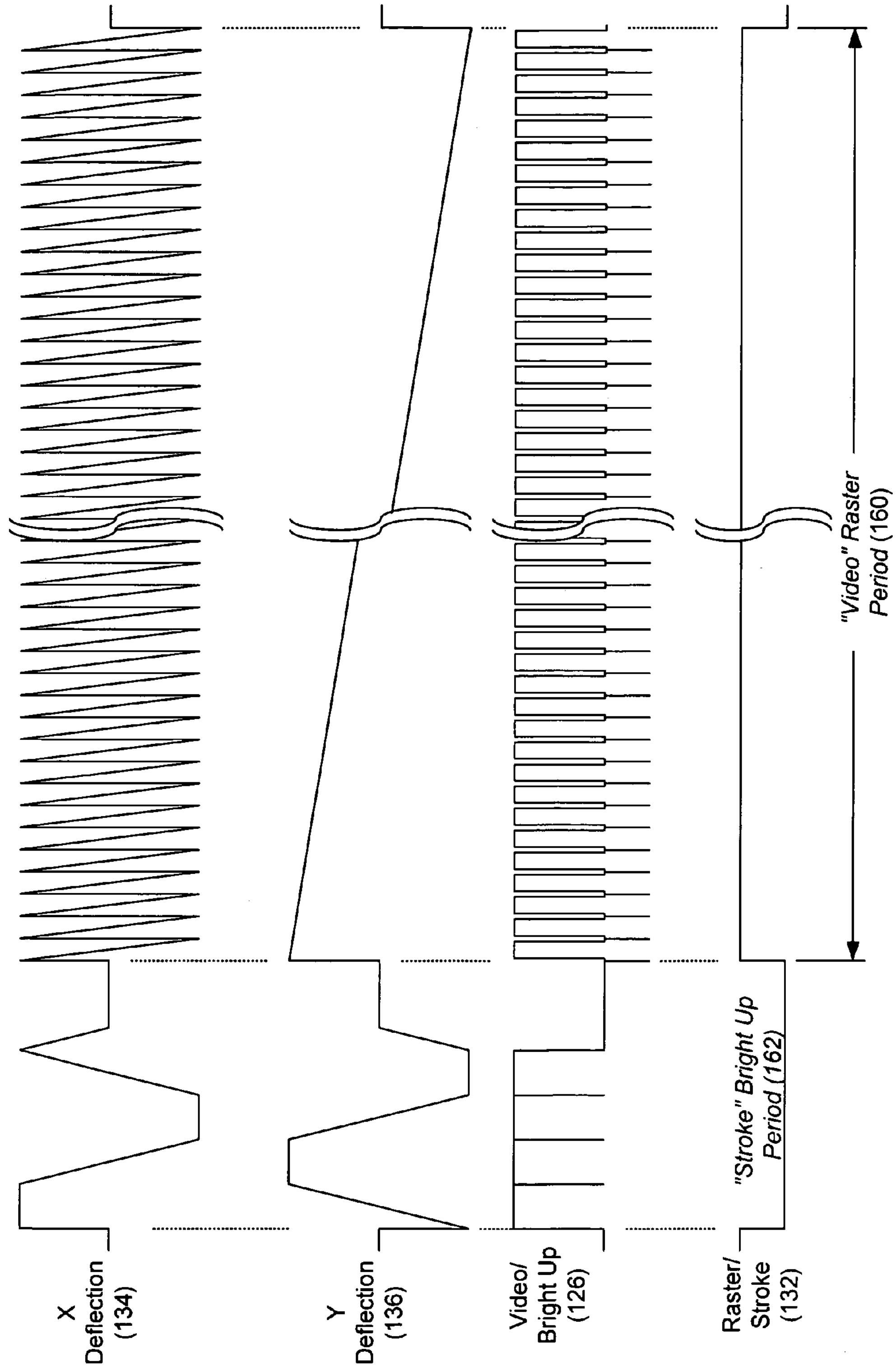
FIG. 2 shows the deflection and video waveforms using the embodiment of FIG. 1.

FIG. 2 depicts the deflection and video waveforms using the preferred embodiment of the invention. Raster video period 160 is generated by X deflection 134 and Y deflection 136 signal and video/bright up 126 signal. X deflection 134 provides horizontal ramps for each line of video. Y deflection 136 signal provides the vertical deflection for all lines in a field or frame of video. The intensity is provided by video/bright up 126. Stroke image 162 is generated during the vertical retrace period. X deflection 134 and Y deflection 136 and video/bright up 126 portion of the intensity, draw the stroke or cursive part of the image. Changing characteristics of X deflection 134 and Y deflection 136 can change the position size and aspect ratio of raster image 160. Raster/stroke signal 132 is used to define which portion of X deflection 134, Y deflection 136 and video/bright up 126 are associated with raster 160 or stroke 162. The term bright up refers to the stroke portion of the intensity signal. The term video refers to the raster portion of the intensity signal.

The present invention can be used for calibration and alignment of any stroke and raster system. Another application would be automatic alignment for heads up displays (HUD) in conversion to digital systems. Image conversion for flight simulators is another potential use. The application could also apply to fabrication and control systems.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

The invention claimed is:

1. A method of automatically adjusting a position of a raster video image on a stroke and raster display apparatus based on an analog deflection signal, the method comprising:

- digitizing the analog deflection signal with a first analog-to-digital converter (ADC);
- digitizing the raster video image with a second ADC, wherein the first ADC is different than the second ADC;
- detecting a reference point in at least one direction from the digitized deflection signal;
- determining an offset of the digitized image from the reference point; and
- digitally adjusting a position of the digitized image on the stroke and raster display based on the determined offset utilizing predetermined display functions.

2. The method of claim 1 wherein the reference point comprises a vertical and horizontal reference point.

3. The method of claim 1 wherein the reference point comprises a vertical reference point.

4. The method of claim 1 wherein the reference point comprises a horizontal reference point.

5. The method of claim 1 wherein the reference point comprises a center reference point.

6. The method of claim 1 wherein determining comprises determining X deflection characteristics and Y deflection characteristics.

7. The method of claim 6 wherein the X and Y deflection characteristics comprise end points, center, slope and detection of the boundaries of the analog deflection signal.

8. The method of claim 1 wherein the predetermined display functions comprise a member from the group consisting of existing addressing display functions and pan scroll display functions.

9. A method of automatically adjusting a scale of an analog deflection based raster image for a stroke and raster display apparatus, the method comprising:

digitizing the analog based raster image by a first analog-to-digital converter (ADC);

receiving and digitizing an analog deflection signal by a second ADC, wherein the first ADC is not the second ADC;

determining at least one dimension of the digitized image utilizing one or more image properties of the digitized deflection signal within a predetermined range; and scaling the digitized image in size and aspect ratio within the predetermined range of the digitized image for rendering on the stroke and raster display.

10. The method of claim 9 wherein determining comprises determining an X dimension and a Y dimension.

11. The method of claim 9 wherein determining comprises determining a vertical reference axis.

12. The method of claim 9 wherein determining comprises determining a horizontal reference axis.

13. The method of claim 9 wherein the image properties comprise digitized deflection data, end points, center and slope detection.

14. The method of claim 9 wherein scaling comprises utilizing display image addressing zoom in/out functions.

15. A method of automatically adjusting, positioning and sizing a raster video image for a stroke and raster display apparatus based on at least one analog deflection signal, the method comprising:

digitizing the analog deflection signal by a first analog-to-digital converter (ADC) and the raster video image by a second ADC, wherein the first ADC is different than the second ADC;

detecting a reference point in at least one direction from the digitized deflection signal;

determining at least one dimension of the digitized image utilizing predetermined image properties within a predetermined range;

determining an offset of the digitized image from the reference point;

digitally adjusting a position of the digitized image based on the determined offset utilizing predetermined display functions; and digitally adjusting the digitized image in size and aspect ratio on the stroke and raster display based on the predetermined image properties of the digitized deflection signal utilizing the predetermined display functions.

16. The method of claim 15 wherein the at least one deflection signal comprises at least one of one of a Y deflection signal and an X deflection signal.

17. The method of claim 15 wherein the reference point comprises a vertical reference point.

18. The method of claim 15 wherein the reference point comprises a horizontal reference point.

19. The method of claim 15 wherein the reference point comprises a center reference point.

20. The method of claim 15 wherein the image properties comprise digitized deflection data, end points, center and slope detection.

21. The method of claim 15 wherein the predetermined display functions comprise a member from the group consisting of existing addressing display functions and pan scroll display functions.

* * * * *